April 3, 1951 D. E. NOBLE 2,547,025

FREQUENCY SELECTIVE CALLING SYSTEM

Filed July 23, 1948 2 Sheets-Sheet 1

INVENTOR.
Daniel E. Noble

BY

Foorman L. Mueller

Atty.

April 3, 1951 D. E. NOBLE 2,547,025

FREQUENCY SELECTIVE CALLING SYSTEM

Filed July 23, 1948 2 Sheets-Sheet 2

INVENTOR.
Daniel E. Noble

BY

Foorman L. Mueller

Atty.

Patented Apr. 3, 1951 2,547,025

UNITED STATES PATENT OFFICE 2,547,025

FREQUENCY SELECTIVE CALLING SYSTEM

Daniel E. Noble, Elmhurst, Ill., assignor to Motorola, Inc., Chicago, Ill., a corporation of Illinois

Application July 23, 1948, Serial No. 40,330

13 Claims. (Cl. 177—353)

This invention relates generally to selective frequency responsive systems and more particularly to calling systems suitable for use with mobile radio communication equipment.

In radio communication networks in which one or more fixed stations and a plurality of remote mobile units intercommunicate, for satisfactory communication it is necessary that a signalling system be provided for calling the various stations similar to signalling systems used in telephone networks. Such signalling may be provided by operation of audible or visible signals at the called station to indicate to the operator that someone desires to communicate with him. In systems where operators are at all times available to receive a message, the calling system may automatically condition the receiver of the party to be contacted so that the message will be translated by his receiver only.

Although telephone calling equipment is available and signalling systems have been provided for other purposes, such available equipment is not of such rugged and simple construction as to be particularly adapted for vehicular installations. To meet the requirements for mobile use, selective calling equipment must be fast in operation, should preferably be capable of operation by signals transmitted over the normal voice channel, and should not respond to voice signals or to noise which is received from the voice channel.

A system designed to accomplish this purpose is disclosed and claimed in application Serial No. 749,952, filed May 23, 1947, by Ralph J. Lense and Alfred S. Holzinger. The present invention is an improvement on the system disclosed in said patent application and is directed toward systems in which a plurality of selective responsive units are arranged in cascade to provide a large number of different calls so that a large number of individual stations can be individually selected.

An object of this invention is to provide an improved selective calling system in which a large number of different calls are available and in which accidental operation of the calling system, as by noise, is minimized.

A further object of this invention is to provide a selective calling system including a plurality of sections in which noise is ineffective to cause operation of any section until the preceding section has been operated.

A feature of the present invention is the provision of a selective calling system including a plurality of sections each of which is responsive to a calling signal including particular frequencies.

A further feature of this invention is the provision of a selective calling system including a plurality of sections arranged in cascade with each section being adapted to provide a control voltage when signals of the proper frequency are applied thereto only when the preceding section is actuated.

A still further feature of this invention is the provision of a selective responsive system including a plurality of sections each being adapted, when a signal including the proper frequencies is applied thereto, to connect the next section to the calling signals and to provide operating voltage therefor.

Further objects, features and advantages will be apparent from a consideration of the following description taken in connection with the accompanying drawings in which.

In practicing the invention there is provided a selective responsive device comprising a first section including a pair of electromechanical contactors and a circuit for charging a condenser when a signal including the proper frequencies is applied to said electromechanical contactors. The voltage across the condenser or a separate voltage source which is triggered by the voltage across the condenser is then used to energize a second circuit including additional electromechanical contactors and a second condenser. The second condenser is charged when a signal including the proper frequencies is applied to the electromechanical contactors of the second circuit. The voltage across the second condenser may be used as a control voltage for operating a signal or for providing switching to condition a receiver for operation. The control voltage will not be produced until a signal including the frequencies of all the electromechanical contactors is applied to the system and, therefore, a very large number of different calls is provided by the system. In an alternative embodiment of the invention not only is the energizing voltage transferred from one section of the system to the next but also the calling signal is applied successively to the sections by a switching means which disconnects the calling signal from one section of the system when this section has responded and applies the calling signal to the next section.

Figure 1:
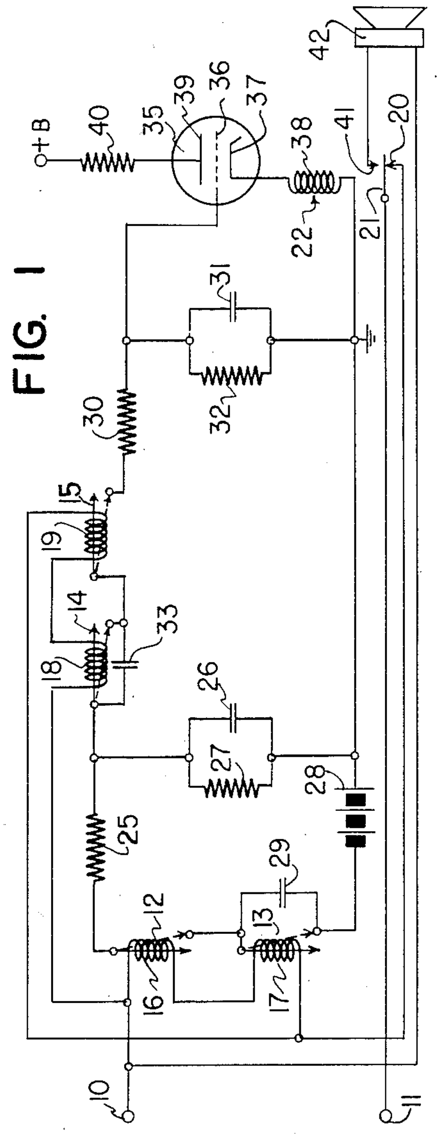
Fig. 1 is a circuit diagram illustrating one embodiment of this invention.

Referring now to the drawings, in Fig. 1 there is illustrated a selective responsive system having input terminals 10 and 11 adapted to be connected to a signal source which includes signals containing the intelligence to be received and also calling signals. The signal source may, for example, be a radio receiver or a wire line. The system includes a plurality of electromechanical contactors 12, 13, 14 and 15 each having an energizing winding, the windings being designated by numerals 16, 17, 18 and 19, respectively. The windings 16, 17, 18 and 19 are connected in a series parallel arrangement with one terminal connected to the input terminal 10 and the other terminal connected through contacts 20 and 21 of relay 22 to the input terminal 11. The electromechanical contactors may be of any construction wherein intermittent contact is provided when signals of predetermined frequencies are applied to the windings thereof. The contactors may be of the vibrating reed type as disclosed in the copending application of Marion R. Winkler, Serial No. 342, filed January 2, 1948.

Figure 3:
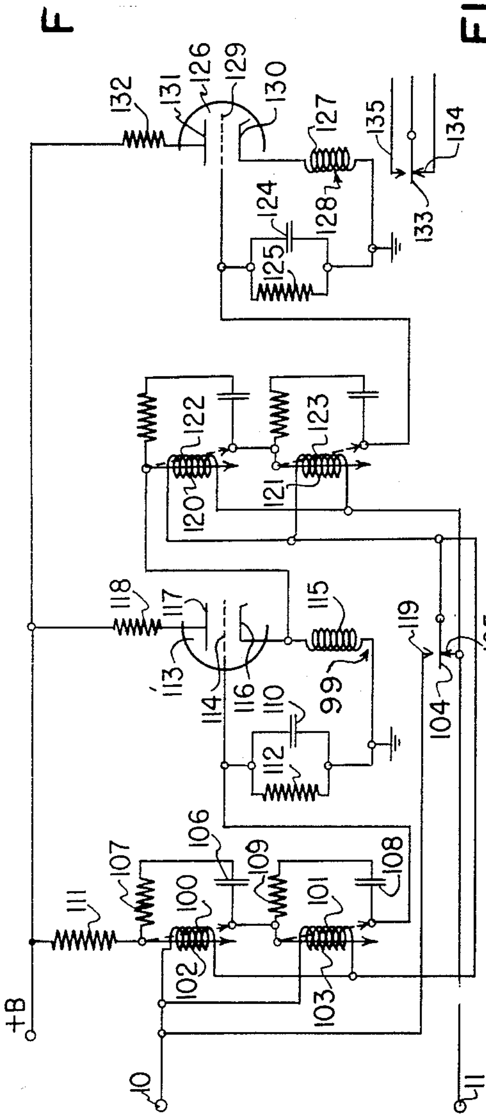
Figure 4:
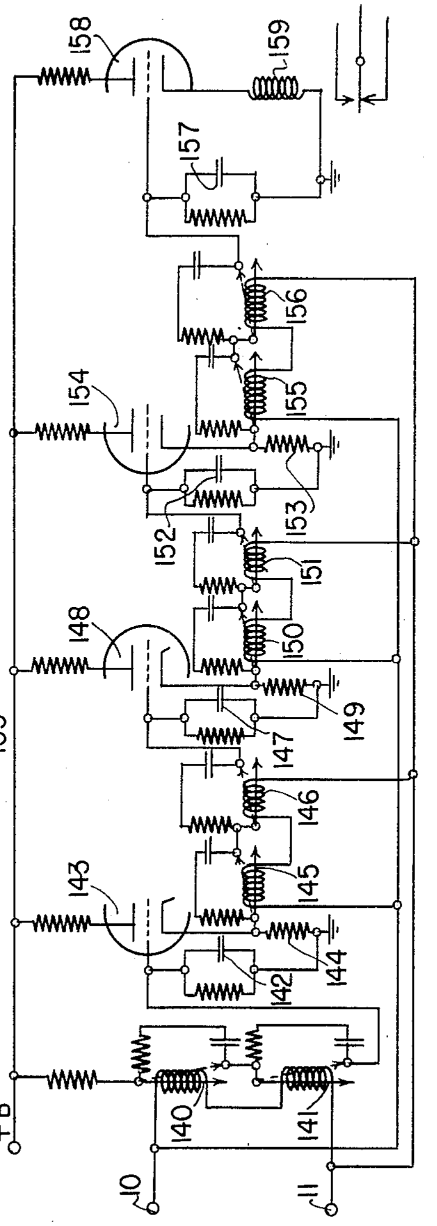

The electromechanical contactors 12 and 13 will be selected so that the frequencies of operation are different but within the same frequency range. The two contactors will, therefor, intermittently close their contacts when a signal including the proper frequencies is applied to the windings 16 and 17 thereof. It is to be noted that a series circuit is provided through the contactors 12 and 13, resistor 25, condenser 26 and resistor 27 in parallel, and battery 28. A condenser 29 is bridged across the contactor 13. As described in the patent application Serial No. 749,952 referred to above, operation of the contactors 12 and 13 will cause the condenser 26 to be charged to a potential approaching that of the battery 28. This results as when contactor 12 is momentarily closed the battery 28 provides a charge on both condensers 26 and 29. Closing of the contactor 13 discharges condenser 29 but the charge remains on condenser 26 and is built up by increments each time the contactor 12 closes. By providing a bridging condenser across the contactor 12, a charge will be built up on condenser 26 each time either contactor is closed. Such an arrangement is shown in Figs. 3 and 4. The resistor 25 limits the charging of condenser 26 and prevents sudden charging thereof when contactors 12 and 13 are closed simultaneously. As the contactors 12 and 13 have different frequencies, they will be closed simultaneously only at the beat frequency of the two contactors, and by providing contactors which operate at relatively close frequencies, the simultaneous closing will be relatively infrequent. The resistor 27 bridged across condenser 26 is effective to discharge the condenser and is of such a value that the condenser will be discharged at a rate to prevent a substantial charge thereon caused by random closing of the contactors 12 and 13 as by noise. The resistor 27 also discharges the condenser 26 after the calling signal has ceased. The resistor 27 is sufficiently large, however, so that the condenser 26 will charge very rapidly when the proper frequencies are continuously applied to the contactors.

As previusly stated, the windings 18 and 19 of contactors 14 and 15 are also connected to the signal source. When the condenser 26 is charged, it forms a source of potential for the second section of the selective responsive system. The second section is substantially like the first being a series circuit including contactors 14 and 15, resistor 30, and condenser 31 and resistor 32 in parallel. A condenser 33 is bridged across the contactor 14. It will be apparent that this series circuit is similar to the series circuit through contactors 12 and 13 with condenser 26 being equivalent to the battery 28. The condenser 31 will, therefore, be charged when signals of the proper frequency are applied to the windings 18 and 19, with the voltage across the condenser 31 approaching that of the battery 28. The voltage across the condenser 31 is applied to the input circuit of vacuum tube 35 being connected to the grid 36 thereof and through the winding 38 of relay 22 to the cathode 37. The plate 39 of the tube 35 is connected through resistor 40 to a source of potential. The plate resistor may not be required in certain applications. When the potential applied on the grid 36 of the tube 35 due to the charge of condenser 31 reaches a predetermined value, the tube 35 will conduct energizing the relay 22 so that the movable contact 21 is moved into contact with the fixed contact 41. This connects the loudspeaker 42 to the terminal 11 and, as the speaker is permanently connected to the terminal 10, the speaker will be directly connected to the signal source. The relay will remain actuated for a short time after the calling signals cease as long as the voltage across condenser 31 remains above the predetermined value. The condenser 31 will, of course, be discharged by resistor 32 with the rate of discharge depending on the value of the resistor. It is apparent that such a system would be applicable for use in a radio receiver to connect the loudspeaker to the signal channel when a calling signal including a plurality of predetermined frequencies is received by said signal channel.

The two-section system as disclosed in Fig. 1 in addition to increasing the number of calls of the system, provides increased discrimination against noise. This results as energizing voltage for the second section is not available until the first has been operated. That is, until a voltage is built up on condenser 26, even though the noise includes frequencies which would operate contactors 14 and 15, these contactors would not be effective to charge the condenser 31. If the noise included all of the frequencies required for the contactors 12, 13, 14 and 15, the possibilities are that the frequencies for contactors 12 and 13 would not be sufficiently continuous to provide the full voltage on condenser 26 so that the effect of noise on contactors 14 and 15 would be diminished and the voltage on condenser 31 would not be great enough to actuate the relay 22. This is especially true as resistors 27 and 32 are effective to reduce the charge on the condensers 26 and 31 caused by random closing of the contactors. The resistors 27 and 32 also gradually discharge the condensers 26 and 31 when fully charged so that for operation of the system the calling signals must follow each other in relatively short order. Also the system will remain in actuated condition for only a limited time after the calling signals cease.

Figure 2:
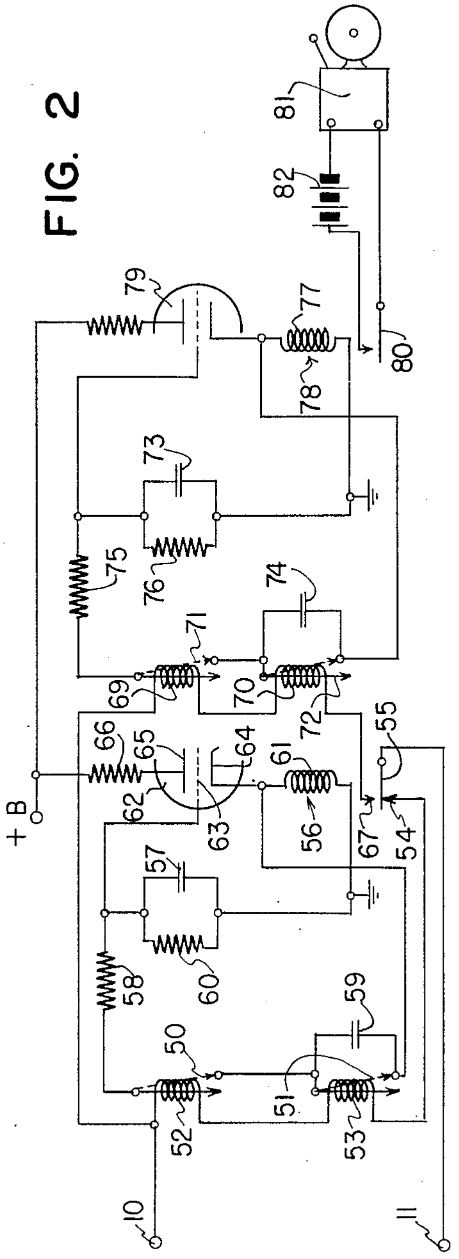
Figs. 2, 3 and 4 illustrate other embodiments of the invention which operate on the same principle.

Referring now to Fig. 2, there is illustrated a modified system in which the calling signals are selectively applied to the electromechanical contactors in the two sections of the system. In this modification the contactors 50 and 51 in the first section include windings 52 and 53 connected in series across the signal source through contacts 54 and 55 of the relay 56. When the calling signal includes the frequencies to which the contactors 50 and 51 respond, the condenser 57 is charged through resistor 58 in the manner previously described. Condenser 59 is bridged across contactor 51 and a resistor 60 provides a discharging path for the condenser 57. The winding 61 of relay 56 provides energizing potential for charging the condenser. The voltage built up on condenser 57 is applied to the triode 62 being connected to the grid 63 thereof and through the winding 61 to the cathode 64. The plate 65 of the triode is connected through resistor 66 to a source of positive potential so that when a voltage of predetermined value is applied to the grid 63 thereof the triode 62 will conduct causing a large current flow through winding 61 of the relay. This causes the movable contact 55 of the relay to move away from fixed contact 54 and into engagement with the fixed contact 67. It will be apparent from the circuit that this operation of the relay 56 disconnects the windings 52 and 53 of contactors 50 and 51 from the signal source and connects the windings 69 and 70 of contactors 71 and 72 thereto.

After the first section of the system has thus been operated, in the event that the calling signal applied to terminals 10 and 11 includes the frequencies to which the contactors 71 and 72 are responsive, these contactors will intermittently operate to charge the condenser 73. A bridging condenser 74 across the contactor 72, resistor 75 for limiting the charging current and resistor 76 for discharging the condenser 73 are provided as in the first section of the system. Energy for the charging circuit is obtained from the winding 77 of the relay 78 which is in the output circuit of the triode 79 in the same manner that the relay 56 is connected to the triode 62. It will be apparent, therefore, that when a predetermined voltage is built up on condenser 73 the relay 78 will be energized causing the contact 80 to close so that a signalling device such as the bell 81 may be connected to the voltage source 82. It is apparent that the relay 78 might alternatively be used to selectively connect a loudspeaker if this is preferable.

In the system just described it is apparent that noise or voice signals including the frequencies to which contactors 71 and 72 respond will be entirely ineffective to produce a voltage on condenser 73 until the first section of the system has operated so that the windings 69 and 70 are connected to the signal source. Therefore, in order for the system to be accidentally tripped by noise, the noise must include the frequencies of contactors 50 and 51 for a sufficiently long time to trip the first section and then contain the frequencies of contactors 71 and 72 for a sufficient time to trip the second section.

In Fig. 3 there is illustrated a modified selective responsive system which includes a plurality of sections as in Figs. 1 and 2 and in which the energizing potential is transferred from the first section to the second as in Fig. 1 and the calling signal is also transferred from the first section to the second as in the system of Fig. 2. In this system contactors 100 and 101 include windings 102 and 103 which are connected in parallel across the terminals 10 and 11 of the signal source by the contacts 104 and 105 of relay 99. The contactors 100 and 101 are respectively bridged by condenser 106 and resistor 107 in series and condenser 108 and resistor 109 in series. A charging path is provided for condenser 110 through the contactors 100 and 101 and through resistor 111 between a +B potential and ground. By providing condensers across each contactor, an increment of charge is provided on condenser 110 each time either contactor is operated. The resistors 107 and 109 limit the current through the contactors 100 and 101 when the condensers 106 and 108 are discharged thereby. Resistor 112 is provided for discharging the condenser 110 as in the manner described above. The voltage across condenser 110 is applied to the triode 113, the condenser being connected to the grid 114 and through the winding 115 of relay 99 to cathode 116. The plate 117 of the relay is connected through resistor 118 to the +B potential so that when the voltage of condenser 110 reaches a predetermined value, the triode 113 will conduct to energize the winding 115 of relay 99. This will cause movable contact 104 to move away from fixed contact 105 disconnecting the windings 102 and 103 from the signal source.

Operation of the relay 99 causes the movable contact 104 to engage fixed contact 119 to connect the windings 120 and 121 of the contactors 122 and 123 of the second section of the system in parallel to the signal source. The contactors 122 and 123 are arranged to charge the condenser 124 from the voltage appearing across the winding 115 of the relay. As in the first section of the system the contactors are bridged by condensers and resistors in series and the main condenser 124 being bridged by a discharging resistor 125. The voltage across condenser 124 is applied to triode 126 being applied to the grid 129 and through the winding 127 of relay 128 to cathode 130 of the triode. The plate 131 of the triode is connected through resistor 132 to the +B potential so that when the voltage on condenser 124 reaches a predetermined value the winding 127 of relay 128 is energized to cause the movable contact 133 thereof to be moved away from fixed contact 134 into engagement with fixed contact 135. These contacts may be used to provide any desired switching operation as to connect a loudspeaker as illustrated in Fig. 1 or to energize a signalling bell as illustrated in Fig. 2.

The system of Fig. 3 includes the advantages of both the systems of Fig. 1 and Fig. 2 in that neither energy nor the calling signal is applied to the second section of the system until the first section operates. In this system accidental tripping is not possible until the proper frequencies are applied to the first section for a sufficiently long time to energize it and then the proper frequencies for the second section are applied for a sufficient length of time, since the second section is not affected by noise until the first section has been operated.

In Fig. 4 a still further system is illustrated for providing a control voltage in response to calling signals of predetermined frequencies. In this system the electromechanical contactors are all simultaneously connected to the signal source and energizing potential is applied successively to the various sections as each section responds to the calling signal. The first section includes contactors 140 and 141 adapted to charge condenser 142 from the +B potential. When a signal including the frequencies to which contactors 140 and 141 respond is applied, the condenser 142 will be charged causing the triode 143 to conduct. A potential is thereby built up on the resistor 144 in the cathode circuit of the triode 143 which potential provides energy for the second section. The second section includes contactors 145 and 146 which charge condenser 147 from the potential across resistor 144 when a signal including the frequencies to which contactors 145 and 146 respond is applied thereto. The voltage on condenser 147 is used to trigger triode 148 so that a voltage is built up across the resistor 149 in the cathode circuit thereof. This voltage is transferred by contactors 150 and 151 to condenser 152 in the same manner resulting in a voltage on resistor 153 in the cathode circuit of the triode 154. A fourth section is illustrated including contactors 155 and 156 which transfer the potential from resistor 153 to condenser 157 which causes operation of the triode 158 to thereby energize the relay 159. It is apparent that any number of sections can be provided as is necessary to provide the number of different calls desired.

The system of Fig. 4, in addition to providing a large number of calls, also provides highly effective discrimination against noise. Although the signal is simultaneously applied to all of the contactors, energy for the charging circuit of each section is not available until the preceding section has been tripped. This system is generally similar to the system of Fig. 1 in this respect except that a partial voltage built up on the condenser 142 on the first section will not provide a reduced charging voltage for the second section as the charging voltage is obtained across resistor 144 which will not provide a potential until the tube 143 conducts. Therefore, each section is entirely de-energized until the preceding section has been tripped and, for example, noise of the frequencies to which contactors 145 and 146 respond will be ineffective to charge the condenser 147 until tube 143 is rendered conductive by the charge on condenser 142. Similar operation will take place in the various sections and high discrimination against noise will be provided.

The provision of a plurality of pairs of signals in sequence provides a much larger number of calls when using electromechanical contactors responsive to a given number of different frequencies. This, therefore, provides a system which would be applicable in networks having a very large number of stations. Although the system may be used when the frequencies for all of the contactors are transmitted simultaneously improved operation has resulted when the pairs of frequencies for the various sections are transmitted in sequence. When all of the signals are sent simultaneously the number of possible calls is reduced as the same frequencies cannot be used in any two contactors. Also discrimination against noise is better when the signals are transmitted in sequence. In the systems shown in Figs. 2 and 3 the various sections of the system are completely isolated with the calling signal being applied to only one section at a time. This would tend to increase the discrimination of the system against noise as the second section is disconnected from the signal source over a large part of the time and voltage would not be built up on the charging condenser thereof by random noise. As in the systems of Figs. 1, 3 and 4 operating voltage for the second section is not applied thereto until the first section is operated, random noise will not be effective to produce a charge on the condenser of the second section. It is also to be pointed out that each section of the systems only remains tripped for a limited time so that the required combinations of frequencies must be applied within a short time interval to operate the systems.

The selective calling systems as described require relatively simple equipment which is not critical of adjustment. A two-section unit requires only a single tube, a twin triode being suitable for the systems of Figs. 2 and 3 or for a two-section system in accordance with Fig. 4. Such a system can be installed in a very small space as available in a mobile communication receiver.

While I have described certain embodiments of my invention which are illustrative thereof, it is obvious that various changes and modifications can be made therein without departing from the intended scope of the invention as defined in the appended claims.

I claim:

1. A system for providing selective operation in response to a calling signal including a plurality of predetermined frequencies, said system including a plurality of pairs of electromechanical contactors individually responsive to said predetermined frequencies, a plurality of impedance elements individually associated with said pairs of contactors, a source of potential, a first circuit including said source of potential, said contactors of one of said pairs and said associated impedance element for producing a voltage across said impedance element in response to a calling signal including frequencies to which said contactors of said one pair are responsive, and at least one additional circuit including another pair of said contactors and the associated impedance element, said additional circuit providing a voltage across said impedance element thereof when a voltage of a predetermined value exists across said impedance element of the preceding circuit, and in response to a calling signal including the frequencies to which the contactors of said additional circuit are responsive, each of said circuits providing a voltage across the impedance element thereof which exceeds said predetermined value for an interval of time after the frequencies to which the particular circuit responds have been applied thereto.

2. A system for providing selective operation in response to a signal including a plurality of predetermined frequencies, said system including in combination, a plurality of pairs of frequency selective devices each of which includes means for providing a conductive path in response to one of said predetermined frequencies, a plurality of impedance elements individually associated with said pairs of frequency selective devices, a source of potential, a first circuit including said source of potential, said devices of one of said pairs and said associated impedance element for producing a voltage across said impedance element in response to a signal including frequencies to which said devices of said one pair are responsive, and at least one additional circuit coupled to said impedance element of said first circuit and including another pair of said frequency selective devices and the associated impedance element, said additional circuit providing a voltage across said impedance element thereof when a voltage exists across said impedance element of the preceding circuit, and in response to a signal including the frequencies to which the devices of said additional circuit are responsive.

3. A selective system including in combination, first and second pairs of frequency responsive devices each one of which includes means forming a conductive path in response to a signal of a different frequency, a source of signals, a source of potential, first and second condensers, a relay including a winding and switch means arranged to normally connect said first pair of devices to said signal source and to disconnect said first pair of devices and connect said second pair of devices to said signal source when said relay is operated, a circuit including said first pair of devices and said first condenser for charging said condenser when a calling signal including the freqeuncies to which said devices of said first pair are responsive is applied thereto, a second circuit including said first condenser and said winding of said relay for operating said relay when said condenser is charged to a predetermined potential, and a third circuit incluuding said winding of said relay, said second pair of devices and said second condenser for charging said second condenser when said winding is energized and in response to a calling signal including the frequencies to which said devices of said second pair are responsive.

4. A system for providing selective operation in response to a signal including a plurality of predetermined frequencies, said system including in combination a plurality of frequency responsive sections, each of said sections including input terminals, a pair of frequency responsive devices, and an electron discharge valve having an input circuit including a condenser and an output circuit including an impedance element, said pair of frequency responsive devices and said condenser of each of said sections being connected in a series circuit across said input terminals thereof, each of said frequency responsive devices including means forming a conducting path therethrough in response to one of said predetermined frequencies, a source of potential, and a circuit for connecting said frequency responsive devices to a source of signals, one of said frequency responsive sections having the input terminals thereof connected to said source of potential for charging the condenser of said one section in response to a signal including the frequencies to which said pair of devices of said one section respond, said condenser being effective to render said electron discharge valve conductive so that relatively large current flows through said impedance element of said one section providing a relatively large voltage thereacross, said additional sections being connected to said first section in cascade with the input terminals of each section connected to the impedance element of the preceding section so that the voltage is transferred to said impedance elements of each section in turn in response to a signal including the frequencies to which the frequency responsive devices of each section are responsive.

5. A selective responsive system including in combination, first and second pairs of frequency selective devices each one of which includes means forming a conductive path in response to a signal of a particular frequency, a source of potential, first and second condensers, an electron discharge valve having input and output electrodes, impedance means, a first circuit including said first pair of devices, said source of potential, said first condenser, said electron discharge valve and said impedance means, said first circuit charging said first condenser when a calling signal including the frequencies to which said devices of said first pair are responsive is applied thereto, said first condenser being connected to said input electrodes of said valve and said impedance means being connected to said output electrodes thereof so that when said first condenser is charged to a predetermined value said valve conducts and a voltage is developed across said impedance means, and a second circuit including said impedance means, said second pair of devices, and said second condenser, said second circuit charging said second condenser from said potential across said impedance means in response to calling signals of the frequencies to which said devices of said second pair are responsive.

6. A system for providing selective operation in response to signals including particular predetermined frequencies comprising, a source of potential, first and second pairs of electromechanical devices each of which includes means forming a conducting path in response to one of said predetermined frequencies, first and second condensers, first and second electron discharge valves having input and output electrodes, an impedance element, a relay, a first circuit including said source of potential, said first pair of devices, and said first condenser for charging said condenser from said source of potential in response to a signal including the frequencies to which said first pair of devices respond, said first condenser being connected to said input electrodes of said valve and said impedance element being connected to said output electrodes thereof so that said condenser renders said valve conducting and a relatively large voltage is developed across said impedance element, and a second circuit including said impedance element, said second pair of electromechanical devices and said second condenser for charging said second condenser from the voltage across said impedance element in response to a signal including the frequencies to which said second pair of devices respond, said second condenser being connected to said input electrodes of said second electron discharge valve and said relay being connected to said output electrodes thereof so that said second condenser renders said second electron discharge valve conducting and said relay is energized thereby.

7. A system for providing selective operation in response to signals including particular predetermined frequencies comprising, a source of potential, first and second pairs of electromechanical devices with each device including means forming a conducting path in response to one of said predetermined frequencies, first and second electron discharge valves having input and output electrodes, an impedance element, a first circuit including said source of potential, said first pair of devices, and said input electrodes of said first electron discharge valve for rendering said valve conductive in response to a signal including the frequencies to which said first pair of devices respond, said impedance element being connected to said output electrodes of said first electron discharge valve so that a relatively large voltage is developed across said impedance element, and a second circuit including said impedance element, said second pair of devices and said input electrodes of said second electron discharge valve for rendering said second electron discharge valve conductive in response to a signal including the frequencies to which said second pair of devices respond.

8. A selective responsive system including first and second pairs of electromechanical contactors each one of which is responsive to a calling signal of a different frequency, a source of calling signals, first and second condensers, a relay including a winding and switch means arranged to normally connect said first pair of contactors to said signal source and to disconnect said first pair of contactors and connect said second pair of contactors to said signal source when said relay is operated, a circuit including said first pair of contactors, and said first condenser for charging said condenser when a calling signal including the frequencies to which said contactors of said first pair are responsive is applied thereto, a second circuit including said first condenser and said winding of said relay for operating said relay when said condenser is charged to a predetermined potential, and a third circuit including said second pair of contactors and said second condenser for charging said second condenser in response to a calling signal including the frequencies to which said contactors of said second pair are responsive.

9. A selective responsive system including first and second pairs of electromechanical contactors each one of which is responsive to a calling signal of a different frequency, a source of calling signals, a source of potential, first and second condensers, a relay including a winding and switch means arranged to normally connect said first pair of contactors to said signal source and to disconnect said first pair of contactors and connect said second pair of contactors to said signal source when said relay is operated, a circuit including said first pair of contactors and said first condenser for charging said condenser when a calling signal including the frequencies to which said contactors of said first pair are responsive is applied thereto, a second circuit including said first condenser and said winding of said relay for operating said relay when said condenser is charged to a predetermined potential, and a third circuit including said winding of said relay, said second pair of contactors and said second condenser for charging said second condenser when said winding is energized and in response to a calling signal including the frequencies to which said contactors of said second pair are responsive.

10. A selective responsive system comprising first and second pairs of electromechanical contactors each one of which is responsive to a calling signal of a different frequency, a source of calling signals, a source of potential, first and second condensers, first and second electron discharge valves, impedance means, a relay, a first circuit including said first pair of contactors, said source of potential, said first condenser, said first electron discharge valve and said impedance means, said first circuit charging said first condenser when a calling signal including the frequencies to which said contactors of said first pair are responsive is applied thereto, said first condenser being connected to the input electrodes of said first valve and said impedance means being connected to the output electrodes thereof so that when said first condenser is charged to a predetermined value said valve conducts and a voltage is developed across said impedance means, and a second circuit including said impedance means, said second pair of contactors, said second condenser, said second electron discharge valve and said relay, said second circuit charging said second condenser from said potential on said impedance means in response to calling signals of the frequencies to which said contactors of said second pair are responsive, said second condenser being connected to the input electrodes of said second electron discharge valve and said relay being connected to the output electrodes thereof so that when said second condenser is charged to a predetermined value said relay is energized.

11. A system for providing selective operation in response to a calling signal including a plurality of predetermined frequencies, said system comprising a plurality of frequency responsive sections, each of said sections including input terminals, a pair of electromechanical contactors, and an electron discharge valve having an input circuit including a condenser and an output circuit including an impedance element, said pair of electromechanical contactors and said condenser of each of said sections being connected in a series circuit across said input terminals thereof, said electromechanical contactors being individually responsive to said predetermined frequencies, a source of potential, and a circuit for connecting said electromechanical contactors to a source of calling signals, one of said frequency responsive sections having the input terminals thereof connected to said source of potential for charging the condenser of said one section in response to a signal including the frequencies to which said pair of contactors of said one section respond, said condenser being effective to render said electron discharge valve conductive so that relatively large current flows through said impedance element of said one section providing a relatively large voltage thereacross, said additional sections being connected to said first section in cascade with the input terminals of each section connected to the impedance element of the preceding section so that the voltage is transferred to said impedance elements of each section in turn in response to a calling signal including the frequencies to which the contactors of each section are responsive.

12. A system for providing selective operation in response to calling signals including particular predetermined frequencies comprising, a source of potential, first and second pairs of electromechanical contactors with the contactors being individually responsive to said predetermined frequencies, first and second condensers, first and second electron discharge valves having input and output electrodes, an impedance element, a relay, a first circuit including said source of potential, said first pair of contactors, and said first condenser for charging said condenser from said source of potential in response to a calling signal including the frequencies to which said first pair of contactors respond, said first condenser being connected to said input electrodes of said valve and said impedance element being connected to said output electrodes thereof so that said condenser renders said valve conducting and a relatively large voltage is developed across said impedance element, and a second circuit including said impedance element, said second pair of contactors and said second condenser for charging said second condenser from the voltage across said impedance element in response to a calling signal including the frequencies to which said second pair of contactors respond, said second condenser being connected to said input electrodes of said second electron discharge valve and said relay being connected to said output electrodes thereof so that said second condenser renders said second electron discharge valve conducting and said relay is energized thereby.

13. A system for providing selective operation in response to calling signals including particular predetermined frequencies comprising, a source of potential, first and second pairs of electromechanical contactors with the contactors being individually responsive to said predetermined frequencies, first and second electron discharge valves having input and output electrodes, an impedance element, a relay, a first circuit including said source of potential, said first pair of contactors, and said input electrodes of said first electron discharge valve for rendering said valve conductive in response to a calling signal including the frequencies to which said first pair of contactors respond, said impedance element being connected to said output electrodes of said first electron discharge valve so that a relatively large voltage is developed across said impedance element, and a second circuit including said impedance element, said second pair of contactors and said input electrodes of said second electron discharge valve for rendering said second electron discharge valve conductive in response to a calling signal including the frequencies to which said second pair of contactors respond, said relay being connected to said output electrodes of said second electron discharge valve and being energized thereby.

DANIEL E. NOBLE.

REFERENCES CITED

The following references are of record in the file of this patent:

UNITED STATES PATENTS

| Number | Name | Date |
|---|---|---|
| 2,173,154 | Bernard | Sept. 19, 1939 |
| 2,457,149 | Herbst | Dec. 28, 1948 |

FOREIGN PATENTS

| Number | Country | Date |
|---|---|---|
| 172,321 | Great Britain | Nov. 2, 1922 |
| 261,384 | Great Britain | Oct. 6, 1927 |